Jan. 13, 1925.

R. McCLENATHEN 1,522,641

TIRE BUILDING MACHINE

Filed Oct. 1, 1923

ROBERT McCLENATHEN
INVENTOR.

BY

ATTORNEY.

ROBERT McCLENATHEN
INVENTOR.

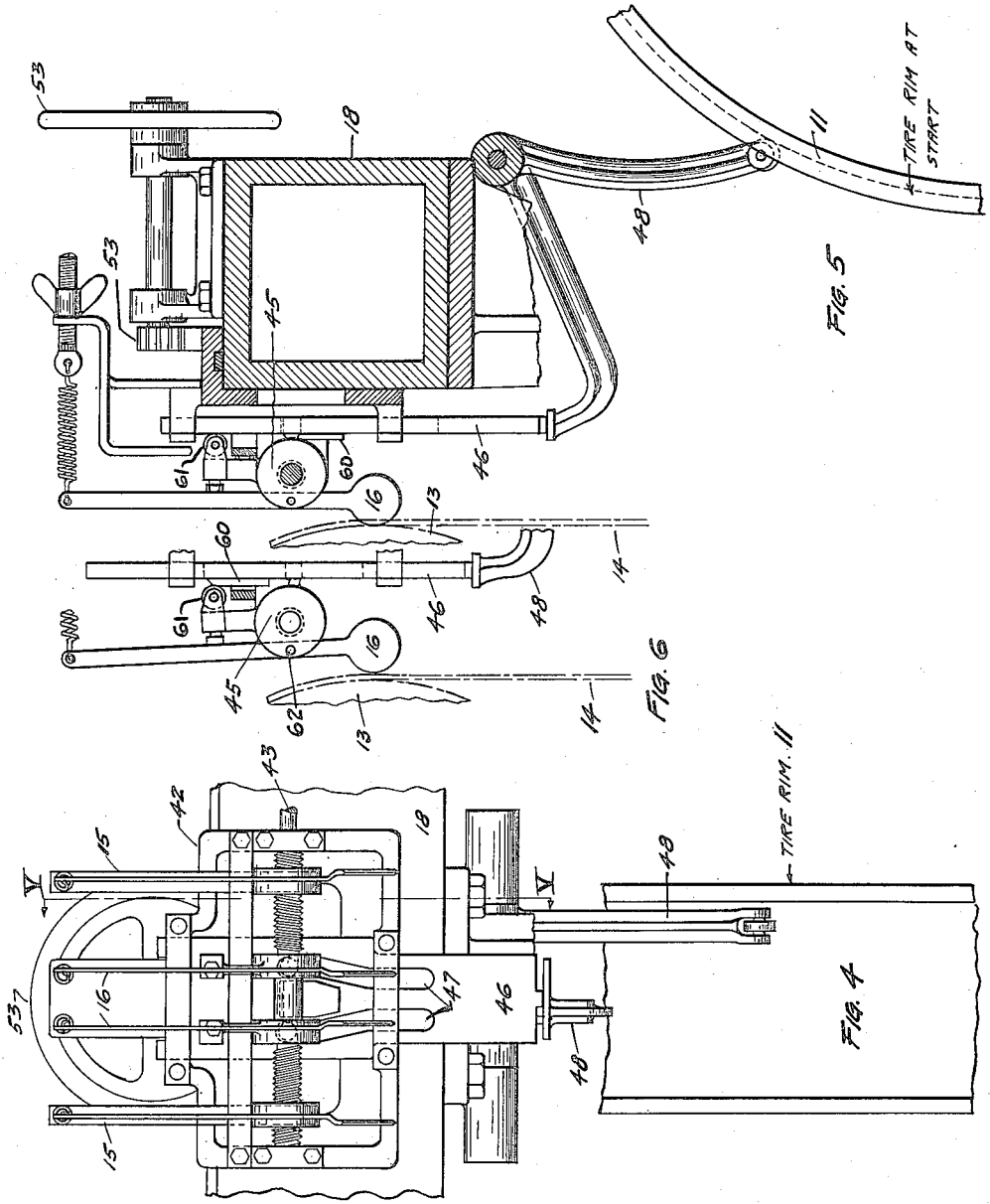

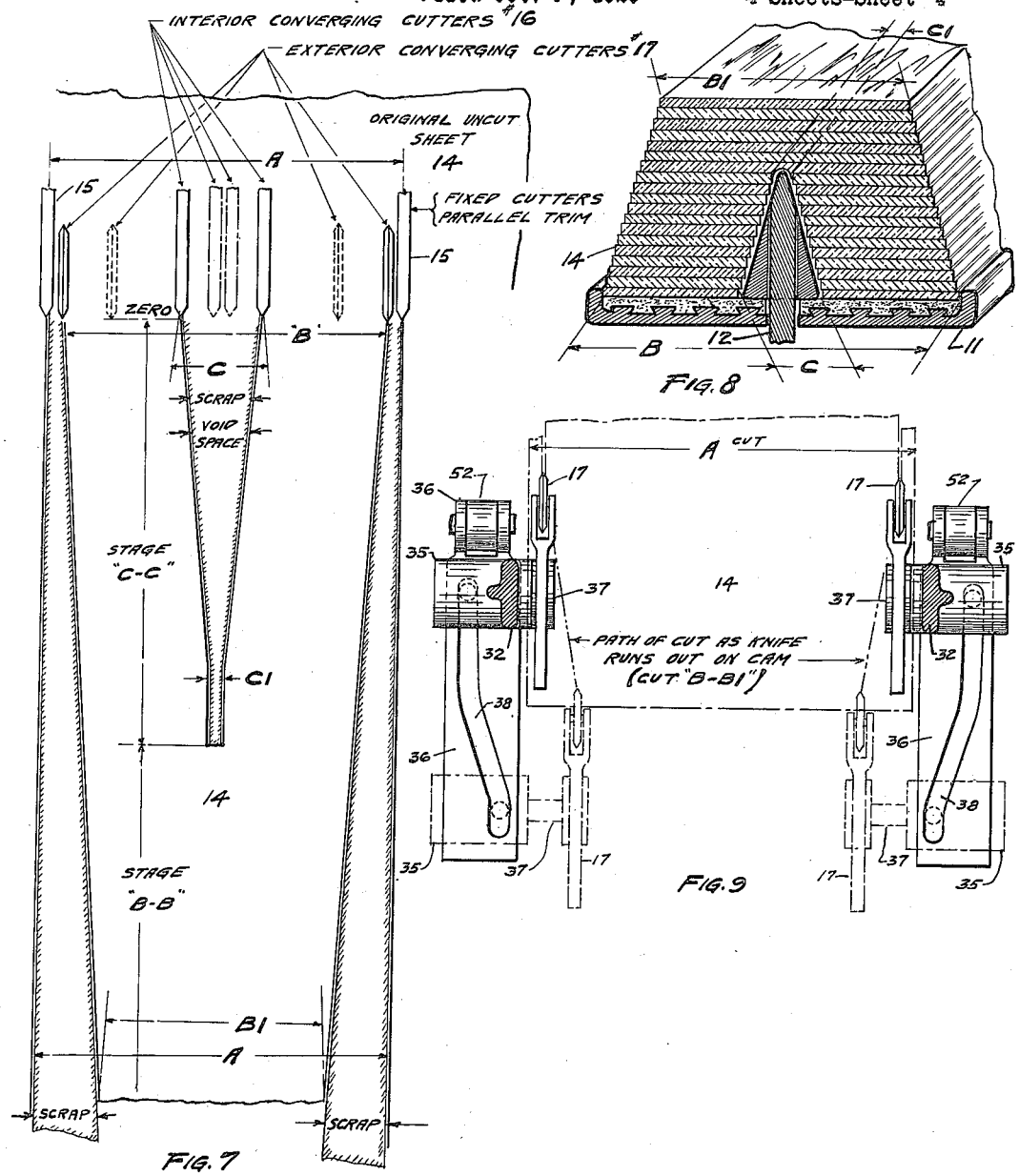

Patented Jan. 13, 1925.

1,522,641

UNITED STATES PATENT OFFICE.

ROBERT McCLENATHEN, OF FROSTBURG, MARYLAND, ASSIGNOR TO KELLY-SPRINGFIELD TIRE COMPANY, OF CUMBERLAND, MARYLAND, A CORPORATION OF NEW JERSEY.

TIRE-BUILDING MACHINE.

Application filed October 1, 1923. Serial No. 665,970.

*To all whom it may concern:*

Be it known that I, ROBERT McCLENATHEN, a citizen of the United States, residing at Frostburg, in the county of Allegany and State of Maryland, have invented certain new and useful Improvements in a Tire-Building Machine, of which the following is a specification.

This invention relates to an improved machine for building up cushion tires of the so-called "hollow center" type, wherein the sheeted rubber stock is taken direct from the calender and wound up upon a metallic base ring to form the article in question.

In order to properly appreciate the intent of this specification it will be helpful to first state, in a general way, the objective sought.

When tires of the laminated type are formed direct upon their permanent base rings by direct windings from a calender, the sheeted stock should be cut into strips of gradually diminishing widths in order that the cross sectional outline and dimensions of the uncured tire shall approximate the desired ultimate form, which is, of course, that established by the confining mold within which they are molded and vulcanized. In my Patent #1,312,491, dated August 5, 1919, an apparatus and process for accomplishing this object on a conventional solid truck tire has been thoroughly discussed.

Since the date of said prior patent a recent type of laminated tire has met with considerable favor; one wherein a "hollow center", or molded internal void space, has become a characteristic means for increasing the resiliency of the structure. This type, which we will term a "cushion tire", is characterized, in its formative stages, by the provision of divided base rings having a radially withdrawable core member introduced between them. (See Fig. 8.) The laminated strips are assembled, first as bifurcated elements on either side of the internal core, simultaneously; then, after the windings have attained the full depth of the core, the remaining tread is wound on by utilizing a unit strip. In the winding-on process, the exterior side walls of the tire are made to slope convergingly toward the tread by automatically tapering-in the width of the sheeted stock as it leaves the calender; all as fully disclosed for another type of tire in my Patent 1,312,491. In the winding operation disclosed in the present application, means are provided not only to taper the sides of the tire in building, but, in addition and simultaneously, to also taper the internal walls adjacent the central core to a predetermined gage corresponding with the limiting dimensions of the said core.

The double tapering effect, exteriorly and interiorly of the tire structure, being attained by means operating directly upon the original parallel strip of rubber cut from the sheeted stock on the calender rolls. The knife-life severing elements being positively controlled by cams automatically operated by appropriate connections which relate their "spread" to the building-up rate of the tire structure—in other words, to the increment of diameter of the windings accumulated upon the ring bases.

In view of the above, the general purpose of this invention is apparent; the novel means employed and made the basis of the present application will be more fully developed throughout the following discussion.

Figure 4, is an enlarged partial view of the upper front of the machine, particularly showing the upper assembly of knives. The outermost being those utilized for the parallel trim-off of the stock, and the centrally located pair those, cam-controlled, for convergingly trimming out the central strip to conform to the contour of the internal core member.

Figure 5, is a sectional elevation in the plane V—V of Fig. 4, showing the cam-control means operable upon the central pair of knives whereby they are caused to converge as the tire material accumulates upon the base rims; thus forming the void ("C—CI"), best shown in Fig. 7.

Figure 6, is merely a duplication of a part of Fig. 5, showing the upward shift of the cam plate under the impulse of the bell crank shifter, in turn rocked by the increase of the tire material on the base rims. The up stroke of the cam causes the central knives to converge toward the limits "CI". (See Fig. 7.)

Fig. 7, is a diagrammatic view showing clearly the three separate trimming operations upon the stock. Cuts "C—CI" and "B—BI" being automatically controlled by their respective cams.

Fig. 8, is an enlarged sectional view through a completely formed tire, showing the related position of the stock (as illustrated in Fig. 7) to the permanent rims and to the removable internal core support.

Fig. 9, is an enlarged sectional view through the plane IX—IX of Fig. 1, showing the cam-controlled knife assembly for making the external converging cut "B—BI" (see Fig. 7). The knives 17 are cutting the sheet 14 against the face of the steel rollers.

Figure 1:
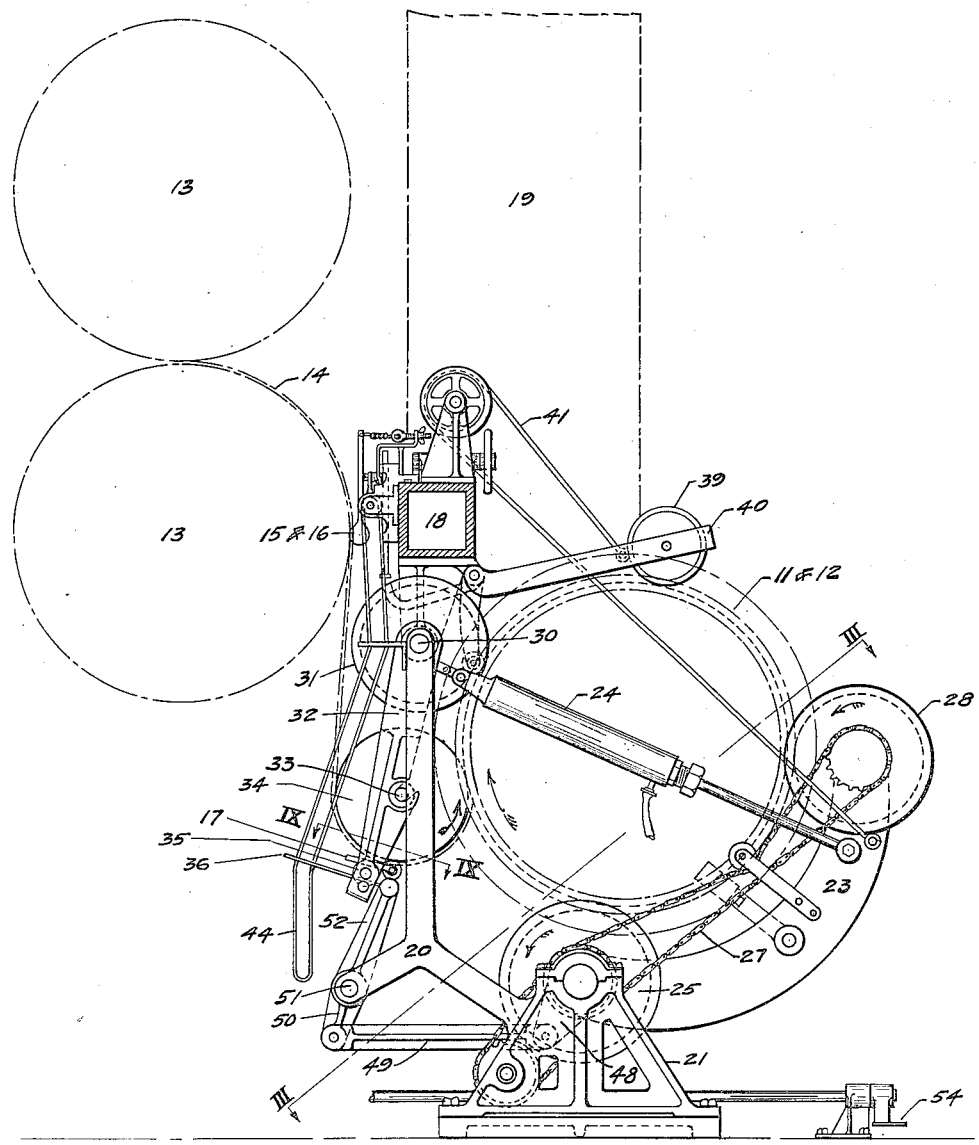
Figure 1, is a side elevation of the machine, showing its relation to the calender, and, in broken lines, a tire in process of winding.

Before proceeding with the development of the discussion, step-by-step, a clear conception of the basic function of the novel mechanism will be imparted by a description of the diagrammatic chart of the trimming operation as disclosed in Fig. 7, attention also being directed to Fig. 8, wherein the stock has become wound upon the base ring preparatory to placing the green structure within the usual molds.

In view of the simplicity of the machine elements utilized, and further considering the general familiarity of those skilled in the art with the basic principles involved in manipulating sheet rubber in the manner described, only a brief description of the mechanical features will be given.

The divided base rims 11, between which are introduced the internal void-forming core 12 are suitably mounted for power rotation close to the calender rolls 13 (see Fig. 1) within appropriate sets of rotary driving and guide elements. The rotating rim assembly is now ready to receive its sheeted stock 14.

The sheeted stock must be trimmed, first, as a bifurcated length with the external cut tapered to form converging sides "B—BI", and the internal cut similarly directed to form the slope "C—CI". Next, and after the full depth of the core 12 has been overlaid and the necessity for the severance of the internal slot in the sheet has ceased, the strip 14 must still continue to wind on the rim 11 under the influence of the external taper cutting knives until the full operation has been attained.

In Fig. 7 the strip of prepared sheeting 14 has, of course, been greatly foreshortened in respect to its length. The diagram merely shows a graphic representation of the effect of the cutting on a strip as it would appear if extended in one plane.

The knives 15, which preliminarily sever the strip 14 as a parallel "leader" to be drawn off the calender roll and around the rim 11 after such stock has been taper cut by additional knives, are adjustably mounted to operate direct against the face of the calender roll in the well-known manner. These knives 15 are set to cut a strip with just enough selvage to insure the proper centering of the strip on the rim 11 and to afford a reasonable tolerance for the external finished trim "B—BI".

The internal converging trim "C—CI" is effected by a pair of knives 16 operating, like knives 15, direct against the face of the calender rolls 13. There knives are cam-controlled (as presently explained) the pitch of the cam being related to the requirements of the converging cutting. The convergence of the knives under their cam control being directly governed by the increment of the winding upon the rim (see Figs. 4 and 5). In Fig. 7 the knives 16 are shown, in full lines, at their wide or starting position on the trim at its maximum width "C". The broken lines show the knives after they have become gradually converged from "C" to "CI", at which point of minimum width (which is at the apex of the core 12 of Fig. 8) they have served their purpose and are thrown out of contact with the stock.

The external converging trim "B—BI" is effected by a pair of knives 17, operating upon the parallel strip of stock cut by knives 15 from the calender. These knives 17 do not operate direct against the calender rolls but, as clearly shown on Figs. 1, 2 and 9, they do the trimming on the face of a pair of rollers contacting with the peripheries of rims 11 over which the parallel leader strip 14 is caused to run. These knives are cam-controlled (as presently explained) the pitch of the cam being related to the requirements of the converging cutting. The convergence of these knives under their cam control being directly governed by the increment of the winding upon the rim (see Figs. 1 and 9). The solid and broken lines show the knives in the extreme "in-and-out" positions.

Again noting Figs. 7 and 8: As soon as a strip 14 is started off the calender rolls 13, knives 15 cut a parallel width "A", which is reduced to a somewhat narrower and tapering dimension "B—BI" by knives 17 before being wound upon the rim 11. At the start of the operation, knives 16 (set to a gage "C") also commence their work of removing the converging interior strip marked "Scrap"; these knives eventually approach each other to the dimension "CI" when they are lifted off the face of the sheet permitting only knives 15 and 17 to perform their respective functions to the completion of the work on a given tire.

At the start of the trim, marked "Zero" on Fig. 7, the three sets of knives 15, 16 and 17 are active (disregarding the small discrepancy between the time of the cutting of the strip at the calender rolls by knives 15 and 16 and its arrival at the rollers on which knife 17 makes its trim).

During the stage "C—C", which is the diagrammatic extent of the internal trim, the three sets of knives are active; knives 16 and 17 converging, as described. When the stage "C—C" has been completed the stock 14 has an internal void or slot cut therein and shaped to lie snugly against the internal core 12, and coextensive with the radial depth thereof. Upon reaching length "C—C" knives 16 are rendered inoperative and the strip 14 enters upon its final stage "B—B", this representing a condition during which knives 15 and 17 continue their respective duties until the full depth of the tire structure has been attained.

In connection with Fig. 7, attention is invited to the aggroupment of all knives, 15, 16 and 17, as though operating in alinement. The positions are, of course, here shown arbitrarily for purpose of illustration. The narrow trim-off between knives 16 and marked "Scrap," is usually deflected to follow around on the calender roll and be used again; also the two side trim-offs between knives 15 and 17 and likewise marked "Scrap," and which is created on the roller 34 on which 17 does its work, may be suitably refed to the feed side of the calender, (all of which will be obvious to those skilled in the art).

*The rim rotating gear.*

Figure 2:
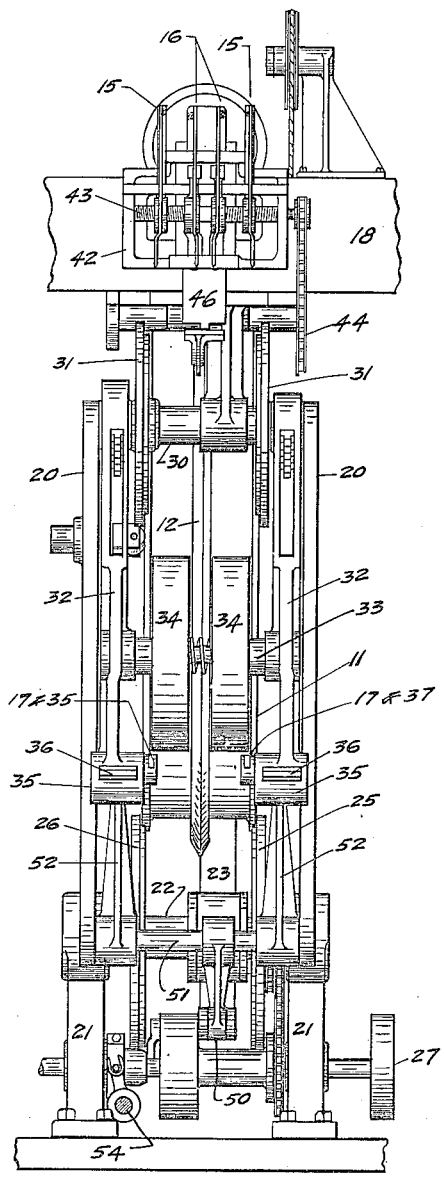
Figure 2 is a front view of the machine; that is, looking away from the calender rolls.
Figure 3:
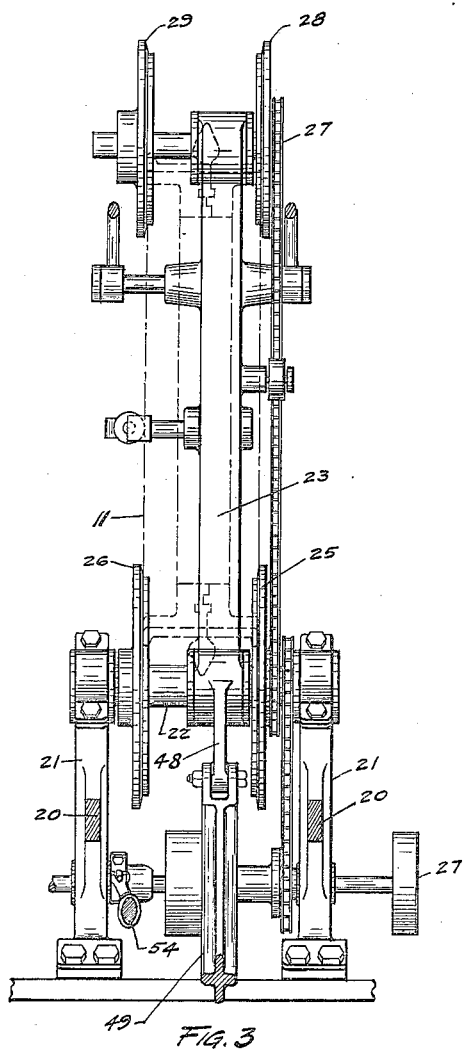
Figure 3, is a sectional view in the plane III—III of Fig. 1, particularly showing the rim supporting and driving means.

The fixed frame of the machine consists primarily of a sturdy box girder 18 running between the side housings of the calender 19 (see Figs. 1, 2 and 3). Attached to this girder by suitable intermediate brackets are side frames 20 which in turn are rigidly connected to a pedestal 21, these members affording anchorages for the various elements of the device. Within pedestal 21 is a horizontal lower shaft 22 on which is journaled a counter balanced rim support beam 23 controlled by an air cylinder 24 suitably anchored to beam 23 and to the pendant frame 32. Also on shaft 22 are mounted a pair of rim engaging rollers 25 and 26. Roller 25 being a power driven member through appropriate gearing, generally indicated as 27, whereas roller 26 is merely an idler serving to support and guide one flange of the rim member 11. On the extreme free end of beam 23 is mounted a set of rollers similar to those just described; of these 28 is power driven in unison with 25 by gearing 27; and 29 is an idler similar to 26. Both rollers 26 and 29 are axially adjustable on their respective spindles to accommodate different widths of rim member 11.

The upper ends of side frames 20 are connected by a fixed shaft 30 on which are journaled a pair of idler rollers 31 serving as flange guides for rim 11 and provided with suitable means for adjusting them in fixed relation (adjusting means not shown).

A pendant frame 32 is also journaled on shaft 30. This frame 32 is connected by a shaft 33 (see Fig. 2) on which are mounted a pair of resiliently separable pressure rollers 34 adapted to spread apart to embrace the core 12 protruding outwardly between the halves of rim 11 and to contract as the sheeted stock 14 is gradually accumulated from the rim base outwardly toward the apex of the core member. These rollers 34 receive the cut stock direct from the operation of the knives 15 and 16, and on them the stock is further trimmed by knives 17 to the predetermined external gauge (see Fig. 9), all as previously explained. Rollers 34 are also the direct means for transferring the trimmed stock to the rims 11, for the sheet is passed under these members and into contact with the rim 11. The rollers 34, being idlers, and pressed firmly against the outer face of rim 11 by the down-pull of the air cylinder 24, are thus caused to rotate by frictional contact with the said rim 11 and to deposit the now fully trimmed rubber sheet thereon.

The free ends of each of the legs of frame 32 are enlarged and slotted in a suitable manner at 35 to serve as slide housings for cam plates 36 which control the path of knives 17, as presently explained. Within the end 35 is a sliding knife holder 37 on which the knife 17 is suitably mounted. The sliding holder 37 is suitably keyed within the cam slot 38 whereby the knife is controlled by the path of the cam when relative movement of plate 36 takes place within housing 35.

From the foregoing it will be apparent that the rim 11 rests on the flanged edges of rollers 25—26, 28—29 and 31—31 and is rotated as there confined in the manner described. When it is desired to place a rim 11 on the rollers, the air is suitably released from cylinder 24 causing the pivoted beam 23 to swing downwardly into a convenient loading position. Once the rim is in place on the down position of 23, and centered on rollers 25—26 and 28—29, the air cylinder is used to pull the beam up until motion is arrested by the edges of the rim 11 engaging corresponding flanges on the idler rollers 31, within which three-point confinement the rim is securely retained.

A suitable compacting roller 39 (see Fig. 1) on the end of a swinging arm 40 is caused to raise and lower with respect to the rim 11 by means of a line 41 carried over a sheave, all in relation to the position of beam 23. In other words, when beam 23 is down for loading, or unloading a finished tire, the roller 39 is up and out of the way; but when beam 23 is pulled up with its rim 11 into place for winding a tire thereon the compacting roller 39 drops into contact therewith and performs its intended function of pressing the wound-up strips more firmly thereon.

Internal converging cut.

Assuming a rim is in place for building the tire (see Figs. 4, 5 and 6). On the face of girder 18 is a suitable hanger 42 through which passes a horizontal spindle 43, the ends of which are threaded in opposite directions to carry the housing portions of knives 15. The spindle 43 is rotatable, and the position of the parallel-cutting knives 15 determined by means of suitable sprocket and chain gear generally indicated as 44. The intermediate portion of 43 is finished smooth to form a journal for the cam operated knife housings 45, which are axially slidable thereon. A vertically slidable cam plate 46 having a pair of cam slots 47 is suitably accommodated by bracket 42. On the housings 45 are suitable cam followers entering the slots 47, whereby a vertical movement of the plate 46 controls the spread of housings 45 and the knives 16, which are suitably retained therein with the customary guides and resilient springs for pressing them against the face of the sheet rubber on the calender rolls.

The cam plate 46 is shown in its "low" position in Figs. 4 and 5, this position corresponding to the widest spread of the knives 16 when they commence the internal cut to gage "C" shown on Figs. 7 and 8; and, of course, this position occurs only at the start of the building operations. In Fig. 6, the cam plate 46 is shown at its high position which corresponds with the narrowest stage "CI," of the internal cut, and at which point the knives 16 are appropriately removed from cutting contact by releasing their contact from the roller 13 when the wedge plate 60 lifts roller 61, causing the knife shank to rock about 62; all in an automatic manner (see Fig. 5).

The cam plate 46 is caused to rise, automatically, in predetermined relation to the increment of windings upon the rim 11 by means of a bell crank lifter 48, shown, "down" in Fig. 5, and "up" in Fig. 6. The lower end of this lifter is fitted with a free follower roller that contacts with the windings on the rim; the entire operation being made clear by the drawings.

External converging cut.

As the start of the winding operation and after the parallel strip, cut by knives 15, and further voided in its center by knives 16, has been guided around the lower side of divided pressure rollers 34 (see Figs. 1, 2 and 9), so that it will be caught by the external face of rims 11 and wound thereon, the final knife trim "B—BI," by cam-controlled knives 17, is in order. In the first place, attention is invited to Fig. 2, wherein the action of these divided rollers 34 in adapting their distance apart to straddle the protruding core piece 12 between rims 11, is clearly indicated. In the first stages of building, the rollers 34 spread themselves apart, hugging the sides of the core, and compacting the bifurcated strips 14 against the face of the rims 11. As the winding proceeds radially outward, the rollers recede and gradually approach as the apex of the core is built up to. Finally, beyond the depth of the core 12, the rollers no longer being held apart, will be drawn together by the tension spring working to that end.

As material is accumulated on the rim 11, the rollers 34 with their pendant frame 32 are forced, gradually, away from the rim. The lower end of 32, fashioned as a slotted cam plate guide at 35, is caused to move with respect to the relatively stationary cam plate 36 (see Fig. 9) whereby the previously explained knife holder 37, actuated by suitable connection with the cam slot 38, is caused to move the knives 17 across the face of the rollers 34 to effect the tapering cut "B—BI." All of which operation will be readily understood by reference to the drawings.

In order that the cam plate 36 shall have an approximately accurate zero, or starting, set with respect to the initial position of the knives 17 at the instant that they start their cut to gage "B," the following arrangement is preferred: On the lower end of beam 23 (see Figs. 1, 2 and 3) a downwardly directed lug 48 is fashioned. A link 49 is pivotally attached to this lug and to the end of an arm 50, which in turn is keyed to a rocker shaft 51 freely rotatable within its journals in extension members on the side frames 20. A pair of arms 52 are likewise keyed into shaft 51 and their upper ends fashioned to journal the forked ends of the cam plates 36. By reference to Figs. 1 and 9, it will be obvious that the relative movement of cam plate 36 on arm 52 within the end 35 of frame 32 can be attained by either a movement of beam 23, up or down, or by an independent movement of arm 32, or by simultaneous movement of both 23 and 32.

Now the practical purpose of the above rigging is to make the cam self-setting, regardless of the diameter of the particular rim being worked upon. Noting Fig. 1, it is apparent that a rim 11 of large diameter will lay within the rollers 25—26 and 31 at the expense of causing rollers 28—29 on the end of the beam 23 to come to rest at a lower point than would be the case if a small rim 11 were used. This matter of relative rest position of rollers 28—29 affecting the initial position of the cam plate 36 through adjustment of the system of linkage previously described. A large rim 11 causes the cam plate 36 to set itself closer to fixed frame 20 than would be the case where a small rim is in place.

The initial position of the plate 36 as related to the diameter of the mounted rim having been described it only remains to be noted that the pressure rollers 34 will initially swing farther toward the right, as viewed in Fig. 1, when a large rim is mounted than when a smaller one is in place. Thus, the cam housing 35 on the end of frame 32 will lay closer to the fixed frame 20 with a large rim in place than when a smaller one is employed.

As the result of these independent means for relating and harmonizing the set of the cam plate 36 and the knife 17 to various diameters of rims, it will be readily seen that the cam cintrol is always accurately set in an automatic manner.

The knives 17, in their cutting operation, are suitably held by well-known resilient spring means (not shown) against the face of the stock 14 as it traverses the periphery of the divided roller 34, and these knives may be suitably rendered inoperative when desired.

It is apparent that the knives 17 reset themselves automatically to start each new trim, for, as soon as a completed tire is removed from the frame, the rollers 34, on arm 32 swing pendantly down, thus retracting the knife holder 37 along the cam grooves 38 of the cam plate 36 to the zero setting.

*General mechanism.*

In order that rims of varying width may be mounted one of each set of rim rotating and guide rollers is made axially adjustable by suitable means (not shown). In other words, one of either of the rollers of sets 25—26, 28—29 and 31—31 is adjustable. The general knife assembly particularly illustrated in Figs. 4 and 5, is likewise made horizontally shiftable along the beam 18 by means of a rack and pinion gear, generally indicated as 53.

As previously stated, the power drive, generally, has been indicated by numeral 27. In order to stop and start the machine at will a suitable clutch control 54 has been indicated whereby an operator may readily regulate the entire procedure.

From the foregoing detail description it will be appreciated that an efficient device has been disclosed whereby the building of tires of the class involved may be proceeded with in a highly economical and effective manner.

It is apparent that there are many mechanical expedients capable of being substituted for the particular mechanisms chosen as a means for illustrating a practical form in which this machine can be successfully constructed, and yet accomplish an equivalent result. I therefore do not limit myself to any particular machine elements in the attainment of the object of this disclosure except as particularly set forth in the appended claims.

I claim:

1. A tire forming machine comprising; means for centering and rotating a rim member; means for severing a strip from sheeted stock to an approximate desired width; means for trimming said severed strip to the desired width; means for removing an elongated strip from the severed strip; and means for winding the trimmed strip upon the rim member, comprising resilient pressure members.

2. A tire forming machine comprising; means for centering and rotating a rim member; means for severing a strip from sheeted stock to an approximate desired width; cam-controlled means for automatically trimming said severed strip to the desired width; cam-controlled means for automatically removing an elongated strip of a predetermined tapered width from the severed strip; and means for winding and compacting the trimmed strip upon the rim member.

3. A tire forming machine comprising; means for centering and rotating a rim member; means for winding and compacting a trimmed strip of sheeted stock upon the rim member; and means for automatically trimming the stock prior to its contact with said rim whereby a portion of the strip is removed to form an internal void within the wound-up tire structure, said trimming means comprising sets of cam-controlled elements, one of which trims the stock exteriorly to form tapering sides to the wound-up tire, and the other to form the said internal void converging outwardly of the wound-up structure, the said cam-controlled trimming means being actuated by means related to the increment of diametrical strip windings upon the said rim, automatically.

4. A tire forming machine comprising; means for centering and rotating a rim member; means for winding and compacting a trimmed strip of sheeted stock upon the rim member; means for automatically trimming the stock prior to its contact with said rim whereby a portion of the strip is removed to form an internal void within the wound-up tire structure, said trimming means comprising sets of cam-controlled elements, one of which trims the stock exteriorly to form tapering sides to the wound-up tire, and the other to form the said internal void converging outwardly of the wound-up structure, the said cam-controlled trimming means being actuated by means related to the increment of diametrical strip winding upon the said rim, automatically; and means for automatically relating the position of one of said cams and its trimming elements to the initial diameter of the said rim members.

5. A tire forming machine comprising; means for centering and rotating a rim member; means for winding and compacting a trimmed strip of sheeted stock upon the rim member; and cam means, automatically controlled by the diameter of the winding upon the said rim whereby trimming elements thereon are caused to simultaneously taper-trim the outer edges of said strip and remove a converging strip of material from substantially the median plane thereof.

6. A tire forming machine comprising; means for centering and rotating a rim member; means for winding and compacting a trimmed strip of sheeted stock upon the rim member; and a plurality of independent sets of trimming knives simultaneously active upon said sheeted stock to trim same to a predetermined gage, said sets comprising a fixed pair set to trim a parallel strip, and other pairs, cam-controlled in relation to the increment of diametrical accumulation of sheeted stock upon said rim, whereby the parallel trimmed stock is further prepared with converging outer edges and a void longitudinal thereof and of progressively diminished width.

7. The combination with a rim having a projection from the face thereof adapted to serve as a void forming core for a laminated tire structure formed thereon; of means for supporting and rotating said rim; sheet rubber transfer and compacting means adapted to receive stock from a source of supply and impress same upon the rim face; and cutting elements adapted to bifurcate a strip of stock conformable to the contour of the said projecting core and having tapering sides, said elements being directed in their cutting, automatically, by cam elements in operable relation to the winding-up rate of said strips upon said rim.

8. A device of the character described, comprising in combination; a sheet rubber forming machine; a rotary tire rim cooperating therewith to receive material therefrom; means for transferring sheeted stock from said machine to said rim; sheet severing means adapted to separate a ribbon-like strip from the residue of stock on the forming machine, said severing means being automatically cam-controlled to simultaneously bifurcate and progressively reduce said strip within predetermined gauge limits whereby a selective cross sectional contour is attained by the aggregate strip wound on said tire rim.

9. A device of the character described, comprising, in combination; a sheet rubber forming machine; a rotary tire rim cooperating therewith to receive material therefrom; means for transferring sheeted stock from said machine to said rim; sheet severing means adapted to separate a strip from the residue of stock on the forming machine; said severing means comprising duplex cutters, cam-controlled to simultaneously remove an intermediate portion of said strip of predetermined width and length and to further trim to gauge the outer edges thereof, said strip cutting means being operably related to the increment of stock on the said tire rim.

10. In a tire forming machine; the combination with a tire rim having a removable core piece projecting exteriorly of the surface thereof; rim rotating means; conveyor means cooperating with said rim for transferring sheeted strip stock from a supply source thereto; strip severing means automatically cam-controlled by the increment of the wound-on strip aggregate on said rim whereby said strip is interiorly voided to a predetermined gauge width to conform with the external contour of said core piece during the winding on process and whereby the outer edges of said strip are taper-trimmed to a predetermined gauge.

In testimony whereof I affix my signature.

ROBERT McCLENATHEN.